(12) United States Patent
Owen

(10) Patent No.: US 9,609,332 B2
(45) Date of Patent: *Mar. 28, 2017

(54) ADJUSTING ENCODING PARAMETERS AT A MOBILE DEVICE BASED ON A CHANGE IN AVAILABLE NETWORK BANDWIDTH

(71) Applicant: Wowza Media Systems, LLC, Golden, CO (US)

(72) Inventor: Barry Owen, Littleton, CO (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/791,747

(22) Filed: Jul. 6, 2015

(65) Prior Publication Data

US 2015/0312572 A1 Oct. 29, 2015

Related U.S. Application Data

(63) Continuation of application No. 14/208,076, filed on Mar. 13, 2014, now Pat. No. 9,106,887.

(51) Int. Cl.
| | |
|---|---|
| *H04N 7/12* | (2006.01) |
| *H04N 19/134* | (2014.01) |
| *H04N 19/102* | (2014.01) |
| *H04N 19/146* | (2014.01) |

(Continued)

(52) U.S. Cl.
CPC .......... *H04N 19/134* (2014.11); *H04L 47/52* (2013.01); *H04N 19/102* (2014.11); *H04N 19/146* (2014.11); *H04N 19/166* (2014.11)

(58) Field of Classification Search
CPC .............................. H04N 19/10; H04N 19/40
See application file for complete search history.

(56) References Cited

U.S. PATENT DOCUMENTS

| | | | |
|---|---|---|---|
| 5,832,125 A | 11/1998 | Reese et al. | |
| 6,349,094 B1 * | 2/2002 | Vastano | ................. H04B 7/022 370/328 |
| 6,496,692 B1 * | 12/2002 | Shanahan | ..................... 455/418 |

(Continued)

OTHER PUBLICATIONS

"FASTVDO: SmartCapture H.264/AVC/AAC Hardware Encoder USB Device", retrieved Mar. 7, 2014 from http://www.fastvdo.com/SmartCapture/, published Jan. 16, 2013, 1 page.

(Continued)

*Primary Examiner* — Nhon Diep
(74) *Attorney, Agent, or Firm* — Toler Law Group, PC

(57) ABSTRACT

A method includes encoding, at a mobile device having a camera, a first portion of a media stream captured by the camera based on an encoding parameter. The method also includes sending the encoded first portion of the media stream from the mobile device to a computing device via a network connection. The method further includes detecting a change in available network bandwidth of the network connection. The method includes automatically adjusting the encoding parameter in response to the change in the available network bandwidth. The method also includes encoding a second portion of the media stream based on the adjusted encoding parameter and sending the encoded second portion of the media stream from the mobile device to the computing device.

20 Claims, 6 Drawing Sheets

(51) Int. Cl.
*H04N 19/166* (2014.01)
*H04L 12/873* (2013.01)

(56) References Cited

U.S. PATENT DOCUMENTS

| | | |
|---|---|---|
| 6,882,624 B1 | 4/2005 | Ma |
| 6,965,604 B1 | 11/2005 | Sato et al. |
| 8,156,235 B2 * | 4/2012 | Barreto .................. H04L 49/90 370/235 |
| 8,503,539 B2 | 8/2013 | Tran |
| 8,634,476 B2 | 1/2014 | Tran |
| 2002/0131496 A1 * | 9/2002 | Vasudevan et al. ..... 375/240.11 |
| 2005/0165696 A1 | 7/2005 | Jakobsson et al. |
| 2007/0121587 A1 | 5/2007 | Mundra et al. |
| 2008/0043643 A1 | 2/2008 | Thielman et al. |
| 2008/0101466 A1 | 5/2008 | Swenson et al. |
| 2008/0120424 A1 | 5/2008 | Deshpande |
| 2008/0181221 A1 | 7/2008 | Kampmann et al. |
| 2010/0166062 A1 | 7/2010 | Perlman et al. |
| 2011/0310227 A1 | 12/2011 | Konertz et al. |
| 2012/0030723 A1 | 2/2012 | Baum et al. |
| 2012/0147946 A1 | 6/2012 | Gao et al. |
| 2012/0250762 A1 | 10/2012 | Kaye et al. |
| 2012/0254456 A1 | 10/2012 | Visharam et al. |
| 2012/0331106 A1 | 12/2012 | Ramamurthy et al. |
| 2013/0329777 A1 | 12/2013 | Konda et al. |
| 2014/0085501 A1 | 3/2014 | Tran |
| 2014/0226711 A1 * | 8/2014 | Ramamoorthy . H04N 19/00472 375/240.02 |
| 2015/0002682 A1 | 1/2015 | Tran |

OTHER PUBLICATIONS

"How can I record and save my live broadcast?", retrieved Jan. 8, 2014 from https://ustream.zendesk.com/entries/21127033-How-can-I-record-and-save-my-live-broadcast-, 2012 Ustream, Inc., 3 pages.

"How to record live streams", (HTTPLiveStreamRecord), retrieved Jan. 6, 2014 from http://www.wowza.com/forums/content.php?123-How-to-record-live-streams-(HTTPLiveStreamRecord), published on Oct. 2, 2010, 14 pages.

"How to set up live streaming using an RTMP-based encoder", retrieved Jan. 6, 2014 from http://www.wowza.com/forums/content.php?36, published Oct. 1, 2010, 8 pages.

"How to use Wowza GoCoder video broadcasting iOS app with Wowza Media Server", retrieved Jan. 6, 2014 from http://www.wowza.com/forums/content.php?500, published Apr. 30, 2013, 12 pages.

"Teradek Bond H.264 Bonded Cellular Broadcast Solution", retrieved Mar. 7, 2014 from http://www.teradek.com/pages/bond, published Feb. 8, 2014, 7 pages.

"Sorenson Media Forum—Adaptive Bitrate Encoding", retrieved Mar. 7, 2014 from http://forum.sorensonmedia.com/forum/content.php?281-Adaptive-Bitrate-Encoding, published Jan. 9, 2012, 3 pages.

* cited by examiner

ADJUSTING ENCODING PARAMETERS AT A MOBILE DEVICE BASED ON A CHANGE IN AVAILABLE NETWORK BANDWIDTH

CROSS-REFERENCE TO RELATED APPLICATIONS

The present application is a continuation of and claims priority to U.S. patent application Ser. No. 14/208,076, filed Mar. 13, 2014, the content of which is incorporated by reference herein in its entirety.

BACKGROUND

The popularity of the Internet, coupled with the ever-increasing capabilities of personal/mobile electronic devices, has provided users with the ability to enjoy, as well as to generate for others to enjoy, multimedia content almost anytime and anywhere. For example, users may receive streams corresponding to live and video on demand (VOD) content (e.g., television shows and movies) at personal electronic devices, such as computers, mobile phones, and tablet computers. Further, users may use a personal electronic device to capture and stream live events (e.g., sports events) to other users. An amount of bandwidth available to stream a live event may vary from location to location. For example, a sudden decrease in available bandwidth at the personal electronic device may result in a viewer of the live event stream experiencing unpleasant viewing condition (e.g., loss of color, loss of definition, stuttering, choppiness, pauses, distortions etc.).

SUMMARY

A computing device capturing a stream may frequently experience a change in network bandwidth, such as when the computing device is a mobile device in possession of a user traveling along a highway. The present disclosure is directed to adjusting encoding parameters at a mobile device in response to a change in available network bandwidth at the mobile device. For example, a mobile device may detect an increase or decrease in available network bandwidth while capturing, encoding, and sending a video stream to another device (e.g., a media server). The change in bandwidth may be due to improving or deteriorating network conditions. To illustrate, if the mobile device is utilizing a cellular connection to send a video stream, available network bandwidth may decrease during handoff of the mobile device between base stations, when the mobile device leaves an outdoor area and enters an indoor area, etc. Conversely, the available network bandwidth may increase when the mobile device leaves an indoor area and enters an outdoor area. As another example, available network bandwidth may change when the mobile device transitions between a third generation (3G) connection, a fourth generation (4G) connection, and an Institute of Electrical and Electronics Engineers (IEEE) 802.11 connection.

In response to a change in available network bandwidth, the mobile device may automatically adjust one or more encoding parameters (e.g., encoding bitrate, frame resolution, frame rate, etc.) used to encode a video stream. The described techniques may thus provide an adaptive encoding system and method that maintains an output video stream in the presence of changing network conditions (e.g., so that a media server receiving the output video stream can continue to generate ABR renditions for destination devices).

DETAILED DESCRIPTION

Figure 1:
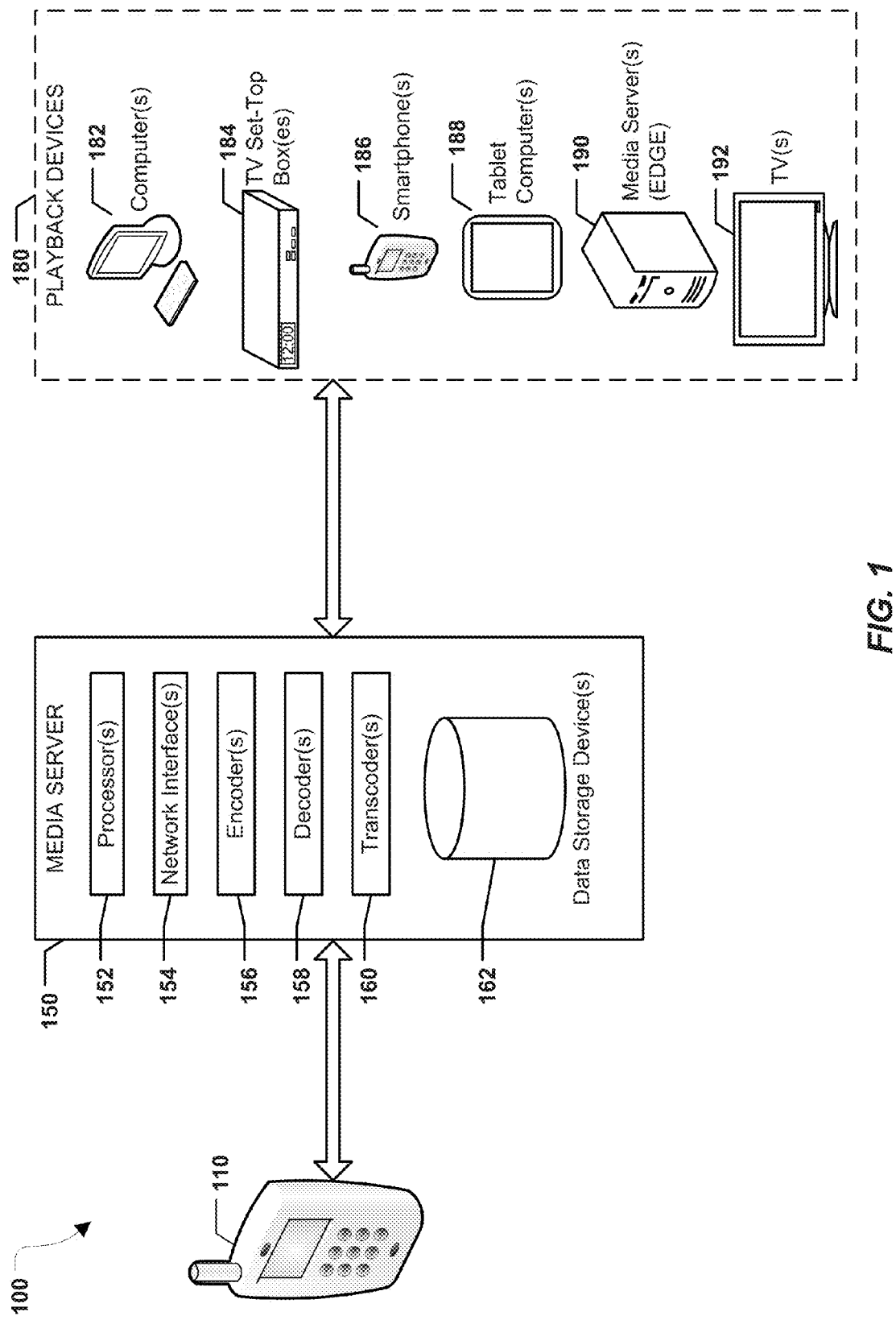
FIG. 1 illustrates a particular embodiment of a system to support adaptive encoding of a stream at a mobile device.

FIG. 1 illustrates a particular embodiment of a system 100 in which multimedia content may be streamed from a mobile device 110 to a media server 150 and vice versa. The media server 150 may process a media stream received from the mobile device 110 and may output the processed media stream (or versions thereof) to one or more computing devices 180.

The mobile device 110 may be a computing device, such as a laptop computer, a mobile phone, a smartphone, a tablet computer, etc. As further described herein, when the mobile device 110 detects a change in available network bandwidth, the mobile device 110 may automatically adjust encoding parameter(s) used to encode a media stream provided to the media server 150.

The media server 150 may include one or more processors 152 and various components that are executable by the one or more processors 152. The media server 150 may correspond to or include software application(s) that perform media serving or processing, hardware systems (e.g., servers) that support or perform media serving and processing, or any combination thereof. Thus, various operations described with reference to the media server 150, or components thereof, may be implemented using hardware, software (e.g., instructions executable by the one or more processors 152), or any combination thereof. In a particular embodiment, one or more operations and/or components described with reference to the media server 150 may correspond to operations and/or components of a cloud-based media server (e.g., a media server available as software as a service (SaaS)).

The media server 150 may include one or more network interfaces 154. For example, the one or more network interfaces 154 may include input interface(s) and output interface(s) that are configured to receive data and to send data, respectively. In a particular embodiment, the one or more network interfaces 154 may be wired and/or wireless interfaces that enable the media server 150 to transfer and receive data via a network, such as the Internet. For example, the one or more network interfaces 154 may include an Ethernet interface, a wireless interface compatible with an IEEE 802.11 protocol, or other wired or wireless interfaces.

The media server 150 may also include encoder(s) 156 and decoder(s) 158, each of which may be implemented using hardware and/or software (e.g., instructions executable by the one or more processors 152). The decoder(s) 158 may decode a stream (e.g., an event being streamed) from the mobile device 110 to generate a decoded stream. The encoder(s) 156 may re-encode the decoded stream (e.g., in accordance with a profile selected by a user of the mobile device 110) to generate one or more second encoded streams. In a particular embodiment, the one or more second encoded streams are adaptive bitrate (ABR) renditions that may have larger or smaller bitrates, frame sizes, etc. as compared to the original stream from the mobile device 110. The media server 150 may stream the ABR renditions to destination devices, such as one or more of computing devices 180, as further described herein.

Transcoder(s) 160 may enable the media server 150 to provide adaptive bitrate streaming in real-time (e.g., on-the-fly) or near-real-time. Data storage device(s) 162 may be used to store streamed events. The data storage device(s) 162 may also buffer chunks of an ABR rendition and store software programs and/or data used by the media server 150 (e.g., a file, such as an extensible markup language (XML) file that includes a profile selected via a GUI, as further described with reference to FIG. 3C). The data storage device(s) 162 may include one or more random access memory (RAM) devices, read-only memory (ROM) devices, hard-drive(s), solid state drive(s), etc.

The computing devices 180 may include devices that are configured to receive media stream(s) from the media server 150. For example, the computing devices 180 may include one or more computer systems 182, such as desktops, laptops, etc. The computing devices 180 may also include one or more televisions (TVs) 192, TV set-top-boxes 184, smartphones 186, and tablet computers 188. In a particular embodiment, the media server 150 is configured to send media streams to other media server(s) 190, such as edge servers of a content delivery network (CDN).

Figure 2:
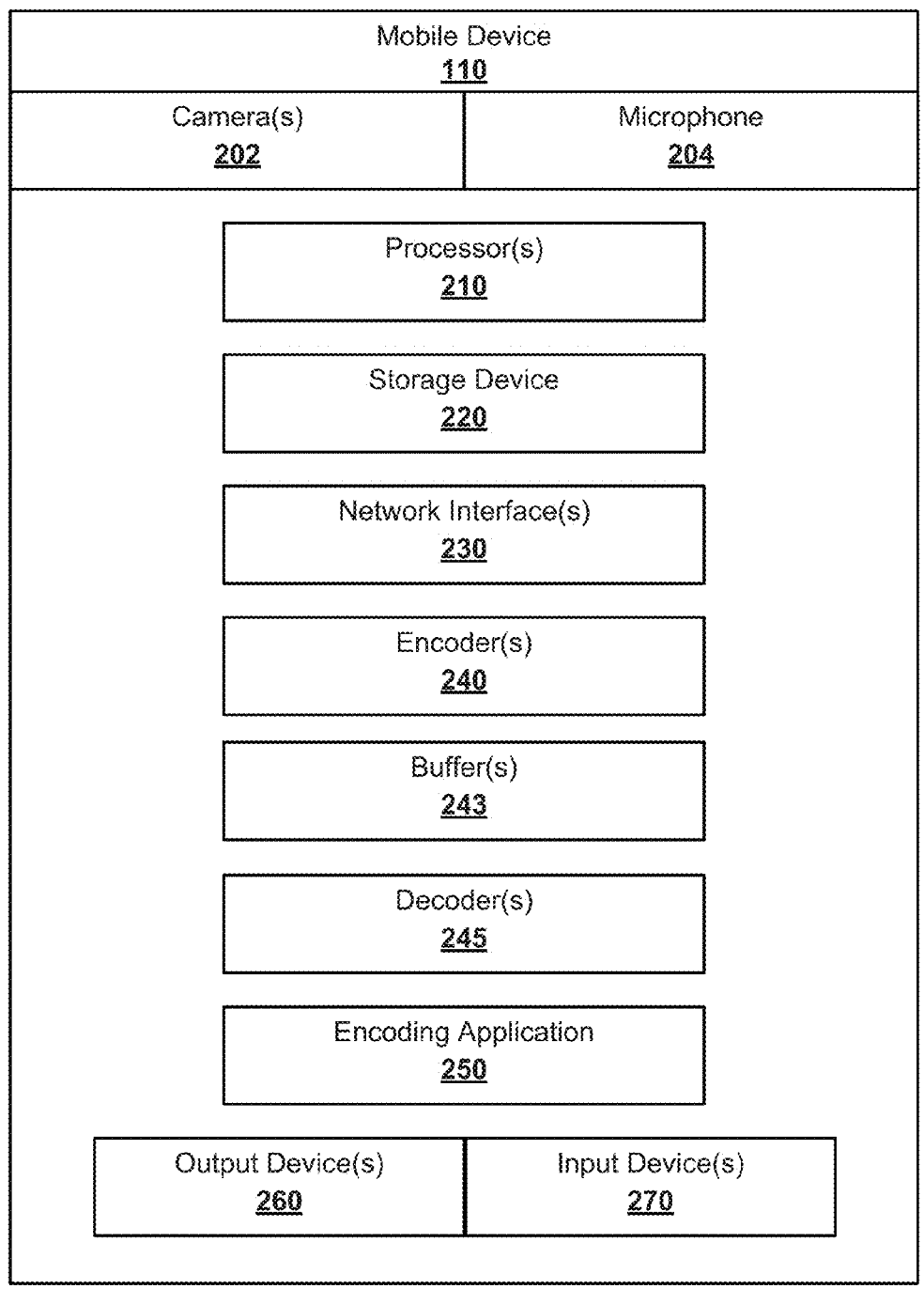
FIG. 2 depicts an exemplary block diagram of the mobile device of FIG. 1.

Referring to FIG. 2, an exemplary block diagram of the mobile device 110 is shown. The mobile device 110 includes one or more processors 210 and one or more network interfaces 230. The one or more network interfaces 230 may include input interface(s) and output interface(s) that are configured to receive data and to send data, respectively. In a particular embodiment, the one or more network interfaces 230 may be wired and/or wireless interfaces that enable the mobile device 110 to transfer and receive data via a network, such as a local area network (LAN) or a wide area network (WAN), such as the Internet. For example, the one or more network interfaces 230 may include an Ethernet interface, a wireless interface compatible with an Institute of Electrical and Electronics Engineers (IEEE) 802.11 protocol, and/or a wireless interface capable of transferring data over a third-generation (3G) connection or a fourth generation (4G) connection (e.g., a Long Term Evolution (LTE) connection and/or a LTE Advanced connection).

The mobile device 110 may also include one or more cameras 202 or other video capture devices and a microphone 204 or other audio capture device to capture live video and/or audio events. The mobile device 110 may contain a storage device 220 for storing captured events as well as software programs and/or data used by the mobile device 110. In a particular embodiment, the storage device 220 may include one or more random access memory (RAM) devices, read-only memory (ROM) devices, hard-drives, solid state drives, and/or other devices that may be used to store data.

The mobile device 110 may further include one or more encoders 240, decoders 245 and an encoding application 250, each of which may be implemented using hardware and/or software (e.g., instructions executable by the one or more processors 210). The one or more encoders 240 may be used to encode data that is to be transferred to the media server 150, and the one or more decoders 245 may be used to decode encoded data received from the media server 150. The encoded data may represent a media stream (or a portion thereof) and may include audio and/or video data. In a particular embodiment, a video portion of the stream may be encoded by the one or more encoders 240 using an Advanced Video Coding (AVC) codec/decoder (codec), also known as H.264, and the audio portion of the stream may be encoded using an Advanced Audio Coding (AAC) codec. H.264 is an industry standard for video compression used for recording, compressing, and distributing high definition video. AAC is a standardized compression and encoding format for digital audio. In alternate embodiments, different video and audio codecs may be used.

In a particular embodiment, the encoder(s) 240 and decoder(s) 245 are configured to use one or more buffers 243 while performing encoding and decoding operations. For example, "raw" video data may be stored in a first buffer. The encoder(s) 240 may retrieve frame(s) of the "raw" video data, encode the frame(s), and store the encoded frame(s) in a second buffer for subsequent processing and transmission to the media server 150.

The encoding application 250 may be a software application, such as an application provided by a vendor of the media server 150. The encoding application 250 may be pre-installed on the mobile device 110 or may be downloaded by a user, such as from a mobile device storefront or the Internet. The encoding application 250 may generate a graphical user interface (GUI) and may send the GUI to an output device 260 (e.g., a display device) of the mobile device 110. A user of the mobile device 110 may interact with the GUI using an input device 270 (e.g., a keyboard, a mouse, a touchscreen, etc.).

Figure 3A:
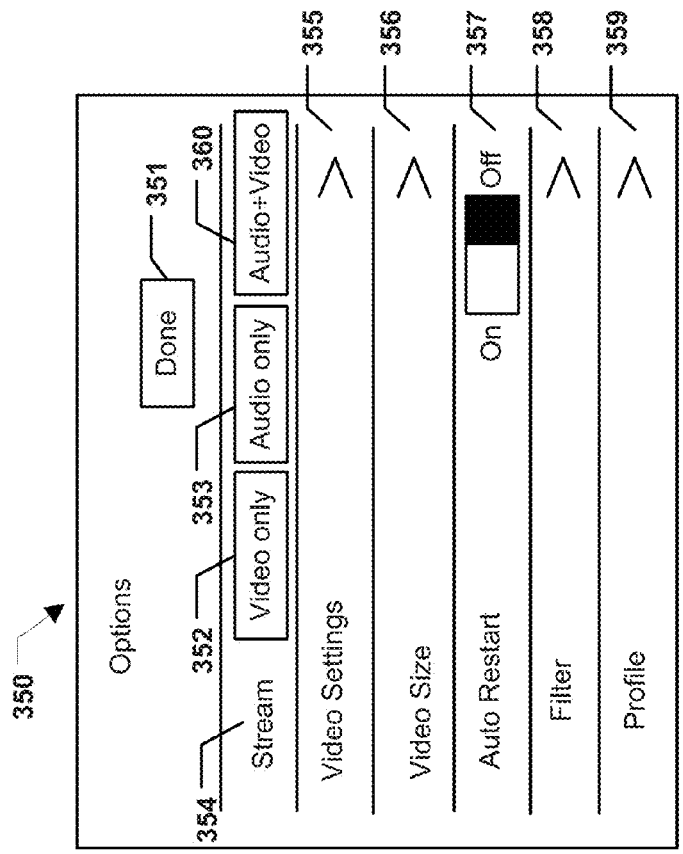
FIG. 3A illustrates an embodiment of a graphical user interface (GUI) generated by the mobile device of FIGS. 1-2.

FIG. 3A depicts an exemplary GUI 300 that may be generated by the encoding application 250. For example, the encoding application 250 may be a software application that is executable at the mobile device 110 to capture and encode a media stream that is transmitted to the server 150. The GUI 300 may be generated and displayed before streaming begins and/or during streaming (e.g., the GUI 300 may overlay all or part of a "viewfinder" screen in a streaming application executed by the mobile device 110).

The GUI 300 includes camera buttons 310 (e.g., selectable icons on a touchscreen corresponding to "virtual" buttons). The camera buttons 310 provide a quick method of determining a status of different components of the one or more cameras 202 as well as a simplified method of changing the status of the components. For example, the mobile device 110 may include a front facing camera and a rear facing camera, either of which may be used to capture a live event. Alternatively, or in addition, the mobile device 110 may include a flash (e.g., light source) to assist video capture of a live event. The camera buttons 310 may include a button 314 in which the status of the flash is indicated. When the button 314 is selected (e.g., pressed or touched), the status of the flash may be changed from one state to another. For example, if the status of the flash is "off", as shown in the GUI 300, selecting the button 314 changes the status of the flash to "on". Conversely, if the status of the flash is "on", selecting the button 314 changes the status of the flash from "on" to "off".

A button 312 enables a user to toggle between the front facing camera and the rear facing camera to capture video. Specifically, if the rear facing camera is active, as shown in the GUI 300, selecting the button 312 deactivates the rear facing camera and activates the front facing camera to capture video. If, on the other hand, the front facing camera is active, selecting the button 312 deactivates the front facing camera and activates the rear facing camera to capture video.

Figure 3B:
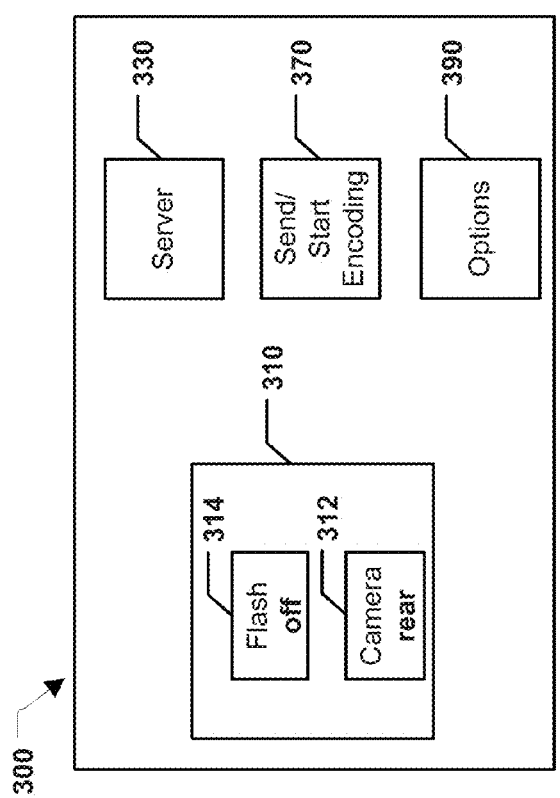
FIG. 3B illustrates another embodiment of a GUI generated by the mobile device of FIGS. 1-2.

The GUI 300 further includes a server button 330. When the server button 330 is selected, a drop-down menu or server GUI may be displayed. FIG. 3B illustrates a representative server GUI 340. The server GUI 340 includes a done button 342, a host option 344, an application option 346 and a login option 348. When the host option 344 is selected, a user is given an opportunity to choose a media server with which the mobile device 110 is to communicate. For example, the user may choose the media server 150 of FIG. 1 by name and/or internet protocol (IP) address. Upon selecting the host option 344, a list of IP addresses and/or server names may be displayed, and the user may select from the list of displayed servers or may manually enter a name or IP address for the server. In addition, the user may be presented with a list of port numbers to choose from. The chosen port number is used for communication between the mobile device 110 and the media server 150. For example, the port may be a transmission control protocol (TCP) port or a user datagram protocol (UDP) port of the media server 150 and/or the mobile device 110. If the user does not choose a port number, then a default port may be used. For example, TCP port 1935 may be used as a default port when TCP is used to communicate with the media server 150.

After selecting the application option 346, the user may enter an "application name" for the media stream. The application name may represent data used by a server to configure a particular stream or set of streams. The configuration information sent from a capture/encoding device to a server may configure a single application. For example, when a capture/encoding device is streaming to an application named "live," the sent configuration information may apply to the "live" application hosted by the server, but does not apply to any of the other applications hosted by the server. In a particular embodiment, the application name is included in a portion of a uniform resource locator (URL) that can be used to view the media stream (or a version thereof). To illustrate, the application "live" may be included in a URL http://www.mymediaserver.com/live/. Selecting the login option 348 provides an opportunity for the user to enter a user name and password for server authentication purposes. Information entered via the server GUI 340 may be used to establish a connection from the mobile device 110 to the media server 150.

In a particular embodiment, a cloud-based server instance may be initialized if a user does not have a preconfigured server (e.g., the media server 150) available to receive and process the media stream. For example, the server GUI 340 may include an additional option that causes the mobile device 110 to request a cloud-based media server to be initialized. Alternatively, or in addition, a cloud-based server may be initialized (e.g., automatically or in response to confirming user input) when the IP address, port, user name, and/or password are not provided or are erroneous. A cloud-based media server may also be used as a backup media server if the mobile device 110 encounters a problem establishing a connection to the media server 150.

To illustrate, the user may select a "Stream to cloud" option 349. The user may be prompted to log in to or register for a cloud-based media server product or service from within the streaming application (or from a web browser launched by the streaming application). For example, the user may have an account that includes billing information for use of the cloud-based media server. Alternatively, a login may not be required (e.g., for a free cloud-based media server) or may be automatically detected based on information associated with the user or the mobile device 110. The streaming application executing on the mobile device 110 may communicate with a network device (e.g., a web server) to provision or initiate a cloud-based media server. The mobile device 110 may receive a playback URL from the network device. For example, the playback URL may be received at streaming application or via a side channel message, such as an e-mail, a short message service (SMS) message, etc. A user may distribute (e.g., via e-mail, SMS message, social networking message, etc.) the playback URL to enable other users to view the media stream (or a version thereof) from the cloud-based media server.

Figure 3C:
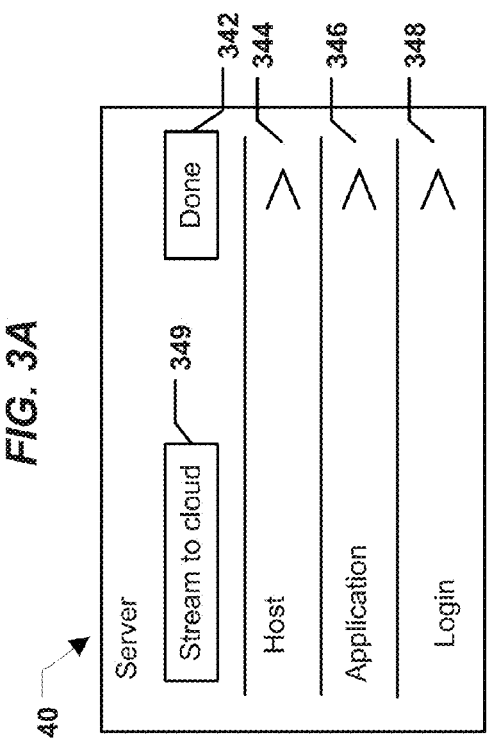
FIG. 3C illustrates another embodiment of a GUI generated by the mobile device of FIGS. 1-2.

After server information has been entered or a cloud-based server has been configured, the user may select the done button 342 to return to the GUI 300 of FIG. 3A. The GUI 300 includes an options button 390. When the options button 390 is selected, a drop-down menu or options GUI may be displayed. FIG. 3C illustrates a representative options GUI 350. The options GUI 350 includes a done button 351, a stream option 354 that includes a video only button 352, an audio only button 353, an audio+video button 360, a video settings option 355, a video size option 356, an auto restart button 357 having an "on" position and an "off" position, a filter option 358, and a profile option 359.

To indicate that the stream to be transferred to a server (e.g., the media server 150) is a video stream having both a video and an audio portion, a user may select the audio+ video button 360. If the user elects to transfer only video data or only audio data to the server, the user may select the video only button 352 or the audio only button 353, respectively. After selecting the video settings option 355, the user may choose a frame rate (e.g., a number of frames per second (fps)) and a key frame interval used to encode the media stream to be sent to the server. The user may also indicate whether the frame rate and/or the key frame interval can be dynamically adjusted by the encoding application 250 in response to a change in available network bandwidth. The available network bandwidth may be a theoretical bandwidth (e.g., a bandwidth available via a particular type of network in "ideal" conditions) or an estimated/measured bandwidth (e.g., a bandwidth determined from empirical data that is collected during network operation). Further, the available network bandwidth may be represented as a maximum available bandwidth or an average available bandwidth, as further described herein. The user may further indicate threshold (e.g., minimum/maximum) frame rates (e.g., so that the encoding application 250 does not produce a media stream that is excessively choppy in response to a change in available network bandwidth). The user may further choose a transport protocol (e.g., TCP, UDP, etc.) to be used to send the media stream to a media server.

In a particular embodiment, the user may also configure, via the video settings option 355, an encoding bitrate that is to be used to encode a media stream. For example, the user may select a particular encoding bitrate from a menu that lists a plurality of available bitrates. The selected encoding bitrate is the encoding bitrate that is to be used to encode the media stream if sufficient network bandwidth is available to communicate the encoded media stream (e.g., to the media server 150) at the selected encoding bitrate. If insufficient network bandwidth exists, the encoding bitrate used to encode the media stream may be dynamically adjusted, as further described herein.

After selecting the video size option 356, the user may choose a video size (e.g., frame resolution) for the stream. Video sizes may include 480×360, 640×360, 640×480, 720p (a high definition format), or another size. The user may also indicate whether the video size can be dynamically adjusted by the encoding application 250 in response to a change in network bandwidth. The user may further indicate a threshold (e.g., minimum/maximum) video size, so that the encoding application 250 does not make the video size excessively small or large in response to a change in available network bandwidth. When the auto restart button 357 is set to "on", the mobile device 110 automatically resumes streaming to the server after re-establishment of a lost connection between the mobile device 110 and the server. When the auto restart button 357 is set to "off", the mobile device 110 does not automatically resume streaming until specifically instructed by the user. The filter option 358 enables the user to indicate whether a filter is to be used when capturing a live event and if so, which filter to use. The filters that may be used include, but are not limited to, black and white (B/W), blur, and B/W blur.

After selecting the profile option 359, the user may indicate whether a profile is to be used to provide control information to the media server 150 and if so, which profile to use. A profile, as explained further herein, may correspond to a set of control parameters in a file stored on the media server 150. In a particular embodiment, a profile includes transcoding parameters, transrating parameters, and/or adaptive bitrate (ABR) streaming parameters to be used by the media server 150 to process the media stream received from the mobile device 110. A profile may also instruct the media server 150 to store a received media stream on a persistent basis (e.g., record the media stream) for video on demand (VOD) or video playback. In a particular embodiment, the profile may also include a name (e.g., file name) for the recorded version of the media stream and/or security settings associated with the recorded version of the media stream (e.g., encryption settings, an access password, etc.)

The user may select the done button 351 to return to the GUI 300 of FIG. 3A, which includes a send/start encoding button 370. The send/start encoding button 370, when selected, instructs the mobile device 110 to establish a connection with the media server 150, begin capturing audio and/or video data, encode the captured audio and/or video data, and start transmitting a media stream that includes the captured audio and/or video data to the media server 150.

Thus, the GUIs 300, 340 and 350 include options to define various options that are may be used to capture, encode, and deliver a media stream, including options related to dynamically adjusting encoding parameters in response to a change in available network bandwidth.

When ABR streaming via one or more ABR protocols is supported by the media server 150, the GUI 300 may include options to define the ABR renditions of a stream to be generated by the media server 150. ABR streaming enables a destination device to request different versions or renditions of a stream in response to changes in network conditions. Changes in network conditions may occur due to various reasons. For example, a viewer may view a media stream provided by the media server 150 using a destination device, such as a smartphone. The smartphone may experience different bandwidths and connection speeds due to the user of the smartphone moving from one physical location to another, changing from a 3G network to a 4G network (or vice versa), network congestion, etc. When network conditions deteriorate, the smartphone may request a lower quality rendition of the media stream (e.g., lower video bitrate, lower audio bitrate, lower resolution, lower frame rate, etc.), so that "smooth" playback of the media stream may be maintained. Conversely, when network conditions improve, the smartphone may request a higher quality rendition of the media stream (e.g., higher video bitrate, higher audio bitrate, higher resolution, higher frame rate, etc.) from the media server 150. To support adaptive streaming, the media server 150 may divide each rendition of the media stream into multiple "chunks" that are key frame aligned. Each rendition may have a different combination of video bitrate, audio bitrate, resolution, frame rate, protocol, etc.

It should be noted that the various parameters and options described herein are for example only and are not to be considered limiting. To illustrate, many different parameters and options may be presented to the user via the GUIs 300, 340 and 350. The parameters and options may include, but are not limited to, frame size, bitrate, video coder/decoder (CODEC), audio CODEC, audio sampling rate, number of audio channel, a parameter of an adaptive streaming group (e.g., input indicating that a first set of renditions is for mobile devices, a second set of renditions is for desktop/laptop computers, and a third set of renditions is for set-top boxes (STBs)), etc. As further examples, a user may be provided options to specify digital rights management (DRM) settings, times that a stream is to be made available to a user, geographic locations that viewers are to be located in to view the stream, etc.

Returning to FIG. 1, during operation at the system 100, a user of the mobile device 110 may activate a streaming application (e.g., the encoding application 250). The streaming application may display configuration GUI(s), such as the GUIs 300, 340 and 350 and may receive configuration input via the GUIs. When the user selects the send/start encoding button 370, the camera(s) 202 and/or microphone 204 may capture a media stream. The mobile device 110 may encode the media stream (e.g., a first portion of the media stream) in accordance with a first set of encoding parameters. For example, the first set of encoding parameters may include a first encoding bitrate, a first frame rate, a first frame resolution, a first key frame interval, a first set of audio/video coder/decoders (CODECs), etc. The mobile device 110 may send the encoded media stream to the media server 150 via a network connection (e.g., a 3G connection, a 4G connection, an IEEE 802.11 connection, etc.). The mobile device 110 may use one of a plurality of streaming protocols to provide the stream to the media server 150, including but not limited to real-time transport protocol (RTP), real-time transport protocol (RTP) control protocol (RTCP), real-time messaging protocol (RTMP), real-time streaming protocol (RTSP).

During transmission of the media stream to the media server 150, the mobile device 110 may experience a change (e.g., increase or decrease) in available network bandwidth of the network connection. As illustrative, non-limiting examples, the available network bandwidth may change when the user changes physical locations or when a wireless medium becomes more or less congested as other devices enter or leave an area.

The mobile device 110 may detect a change in available network bandwidth in various ways. For example, the mobile device 110 may detect the change based on a type of the network connection. To illustrate, the mobile device 110 may detect that a network connection of a first type (e.g., 3G, 4G, IEEE 802.11, etc.) has been lost but a network connection of a second type is available, where the first and second types of network connections have different theoretical or measured available bandwidths. As another example, the mobile device 110 may detect a change in available network bandwidth based on a signal strength (e.g., a decibel (dB) measurement corresponding to a signal-to-noise ratio (SNR), a signal-to-interference-plus-noise ratio (SINR), etc.) of the network connection as measured by the mobile device 110 and provided to an encoding application via an application programming interface (API). As another example, the mobile device 110 may detect a change in available network bandwidth based on quality of service (QoS) information generated by networking hardware at the mobile device 110 and/or received from the media server 150.

When TCP is used to transmit the media stream, the mobile device 110 may detect a change in available network bandwidth based on TCP packet loss. For example, in the event of a loss of a TCP packet, the media server 150 may request that the mobile device 110 retransmit the packet. Alternatively, the mobile device 110 may automatically resend any packets for which the mobile device 110 has not received an acknowledgement from the media server 150. The mobile device 110 may track the number of packets that have been retransmitted to estimate available network bandwidth. When RTP is used to transmit the media stream and RTCP is used in conjunction to monitor quality of service (QoS), the mobile device 110 may detect a change in available network bandwidth based on a receiver report associated with the media server 150. It should be noted that the mechanisms described herein to estimate or measure available network bandwidth are for illustration, and not to be considered limiting. In alternate embodiments, different mechanisms may be used to measure or determine available network bandwidth.

In response to the change in available network bandwidth, the mobile device 110 may automatically adjust one or more encoding parameters to generate a second set of encoding parameters. The mobile device 110 may begin encoding the media stream (e.g., a second portion of the media stream) based on the second set of encoding parameters instead of the first set of encoding parameters and may send the encoded media stream to the media server 150. It should be noted that because slight variations in available network bandwidth may occur fairly frequently, not all changes in available network bandwidth result in an adjustment of encoding parameter(s). In a particular embodiment, the mobile device 110 may dynamically adjust encoding parameter(s) if a detected change in available network bandwidth exceeds a threshold, which may be expressed as a percentage or as a value in bits/kilobits/megabits or bytes/kilobytes/megabytes per second. When a change in available network bandwidth exceeding the threshold is detected, the mobile device 110 may adjust a single parameter or multiple encoding parameters.

In a particular embodiment, the mobile device 110 may use buffering (e.g., the buffer(s) 243 of FIG. 2) to keep a media stream intact and prevent data loss. When streaming an event to the media server 150, the mobile device 110 may encode a video frame (or a portion thereof) and place the encoded frame (or portion thereof) in the buffer. Encoded video data may arrive in the buffer at a speed equal to the encoding bitrate. The encoded video data in the buffer may be segmented into packets that are queued for transmission to the media server 150 in accordance with a network connection speed available to the mobile device 110. For example, when available network bandwidth decreases, the encoding bitrate may exceed the available network bandwidth (or a threshold percentage thereof), resulting in buffer overflow. The buffer overflow may cause dropped packets and video artifacts, such as loss of color, loss of definition, stuttering, choppiness, pauses, distortions, etc. To prevent buffer overflow, the mobile device 110 may decrease encoding quality, so that the media stream continues to be provided to the media server 150 without (or with minimal) interruption. For example, the mobile device 110 may decrease the encoding bitrate, decrease the frame resolution, decrease the frame rate, increase the key frame interval, change the audio/video CODEC(s) in use, etc.

Conversely, when available network bandwidth increases, the mobile device 110 may increase encoding quality to take advantage of the additional available bandwidth and prevent buffer underflow. For example, the mobile device 110 may increase the encoding bitrate, increase the frame resolution, increase the frame rate, decrease the key frame interval, change the audio/video CODEC(s) in use, etc. In a particular embodiment, even though available bandwidth increases, the mobile device 110 may determine not to increase encoding quality (e.g., to conserve battery power when the mobile device 110 has less than a threshold amount of battery power remaining).

In a particular embodiment, the mobile device 110 may adjust encoding parameters in a hierarchical order. For example, the mobile device 110 may continue to adjust a first encoding parameter (e.g., bitrate) until a threshold is reached while maintaining a second encoding parameter (e.g., frame rate or frame resolution). Once the first encoding parameter is outside of a threshold range, the mobile device 110 may begin adjusting the second encoding parameter. If all applicable user-defined thresholds are reached and the mobile device 110 remains unable to send the media stream to the media server 150, an error message may be generated and displayed to notify the user that the provision of the stream to the media server 150 has stopped because the quality of the stream is below what is acceptable to the user. There are times, however, when any picture or video display is better than none. This is particularly true when the stream that is being provided to the media server 150 is to be used for law enforcement or surveillance purposes. In those cases, the resolution may continue to be decreased and the stream may continue to be provided to the media server 150.

In certain cases, a user may not have to manually enable the mobile device 110 to use lower/higher encoding bitrates, frame rates, and resolutions in order to match a rate that a buffer fills up to a network connection speed. Rather, the mobile device 110 may automatically determine whether to use a lower/higher encoding bitrate, frame rate, and resolution. Further, the mobile device 110 may automatically make a particular adjustment in response to determining that the adjustment can be made without a noticeable impact to a viewer (e.g., lowering the frame rate from 30 frames per second (fps) to 25 fps).

In a particular embodiment, in response to a change in available network bandwidth, the mobile device 110 may instruct the media server 150 to change an ABR encoding parameter in use at the media server 150 to generate ABR renditions of the media stream. To illustrate, when available network bandwidth decreases, the mobile device 110 may transmit a lower bitrate version of the media stream to the media server. In this scenario, it may be impractical to generate certain high-quality (e.g., high definition (HD)) ABR renditions of the media stream at the media server 150. Thus, the mobile device 110 may change a profile in use at the media server 150 to stop generation of such high-quality renditions.

It will thus be appreciated that, as described with reference to FIGS. 1-3, the systems and methods of the present disclose may enable dynamic adjustment of encoding parameters at a mobile device in response to a change in available network bandwidth, so that the mobile device may continue to provide a captured stream to another device (e.g., a media server). Maintaining provision of the captured stream to the media server 150 may decrease the occurrence of video issues at streaming devices that receive the media stream (or an ABR rendition thereof) from the media server. Encoding systems that are used to capture live events are generally expensive, large-scale, and have a dedicated, reliable wired networking connection. Thus, owners of such systems may not be concerned with changes in network bandwidth, because such changes may occur rarely. In contrast, mobile devices that rely on wireless connectivity may experience changes in network bandwidth fairly routinely. The described techniques may enable such mobile devices to reliably serve as stream capture sources at a reduced cost and with greater mobility/flexibility as compared to hardwired encoding systems.

Figure 4:
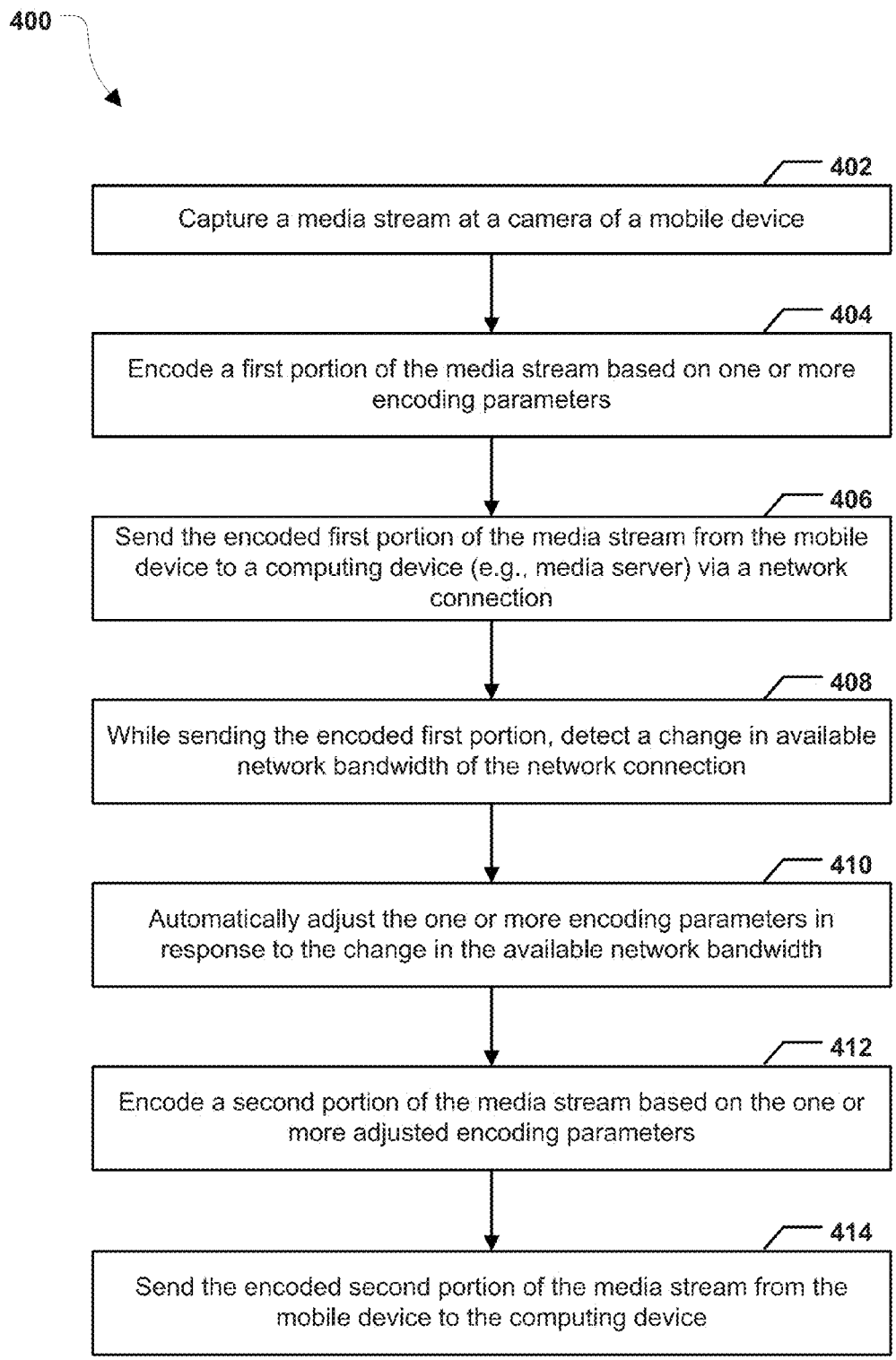
FIG. 4 is a flowchart that illustrates an embodiment of a method of adjusting encoding parameters at a mobile device based on a change in available network bandwidth.

FIG. 4 illustrates a particular embodiment of a method 400 of adjusting encoding parameters at a mobile device based on a change in available network bandwidth. In an illustrative embodiment, the method 400 may be performed by the mobile device 110 of FIGS. 1-2.

The method 400 includes capturing a media stream at a camera of a mobile device, at 402. For example, the camera(s) 202 of the mobile device 110 may capture a media stream that includes audio and/or video data. The method 400 also includes encoding a first portion of the media stream based on one or more encoding parameters, at 404. For example, the encoder(s) 240 of the mobile device 110 may encode a first portion of the media stream based on one or more encoding parameters that are automatically determined and/or selected via user input at the GUIs 300, 340, and 350.

The method 400 further includes sending the encoded first portion of the media stream to a computing device via a network connection, at 406. For example, the mobile device 110 may send the encoded first portion of the media stream to the media server 150 via a network connection. In an illustrative embodiment, the encoded first portion is sent via a local area network (LAN), a wide area network (WAN), and/or the Internet.

The method 400 includes, while sending the encoded first portion, detecting a change in available network bandwidth of the network connection, at 408. For example, the mobile device 110 may detect a change in available network bandwidth based on network connection type (e.g., 3G, 4G, IEEE 802.11, etc.), signal strength, QoS information, packet loss, a receiver report, or by some other mechanism.

The method 400 also includes automatically adjusting the one or more encoding parameters in response to the change in the available network bandwidth, at 410. For example, the mobile device 110 may adjust an encoding bitrate, a frame rate, a frame resolution, a key frame interval, an audio CODEC, a video CODEC, etc. In a particular embodiment, the mobile device 110 may adjust the encoding parameters in a hierarchical order based on user-defined thresholds or threshold ranges, as described with reference to FIGS. 1-3.

The method 400 further includes encoding a second portion of the media stream based on the one or more adjusted encoding parameters, at 412, and sending the encoded second portion of the media stream from the mobile device to the computing device, at 414. For example, the encoder(s) 240 of the mobile device 110 may encode a second portion of the media stream based on the one or more adjusted encoding parameters, and the mobile device 110 may send the encoded second portion to the media server 150.

The method 400 of FIG. 4 may thus enable a mobile device, such as the mobile device 110, to dynamically adjust encoding parameter(s) in response to changes in available network bandwidth of a network connection. Dynamic adjustment of encoding parameter(s) may help maintain a streaming connection between the mobile device and another computing device, such as a destination device or a media server (e.g., the media server 150). To illustrate, when available network bandwidth at the mobile device 110 suddenly decreases, the mobile device 110 may still be able to provide a media stream to the media server 150, and the media server 150 may continue to generate ABR renditions of the media stream and provide the ABR renditions to destination devices without interruption.

Figure 5:
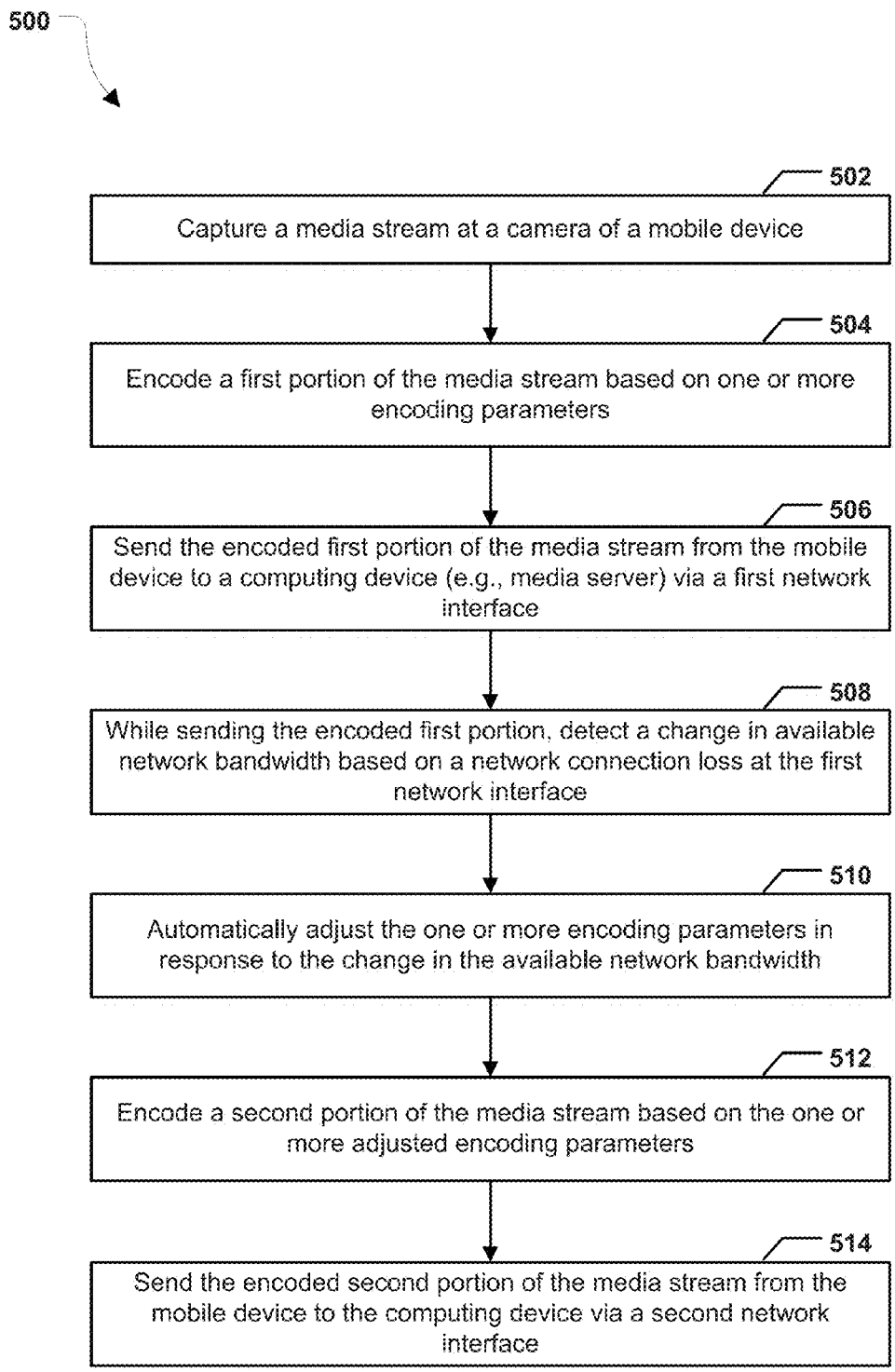
FIG. 5 is a flowchart that illustrates another embodiment of a method of adjusting encoding parameters at a mobile device based on a change in available network bandwidth.

FIG. 5 illustrates another particular embodiment of a method 500 of adjusting encoding parameters at a mobile device based on a change in available network bandwidth. In an illustrative embodiment, the method 500 may be performed by the mobile device 110 of FIGS. 1-2.

The method 500 includes capturing a media stream at a camera of a mobile device, at 502. For example, the camera(s) 202 of the mobile device 110 may capture a media stream that includes audio and/or video data. The method 500 also includes encoding a first portion of the media stream based on one or more encoding parameters, at 504. For example, the encoder(s) 240 of the mobile device 110 may encode a first portion of the media stream based on one or more encoding parameters that are automatically determined and/or selected via user input at the GUIs 300, 340, and 350.

The method 500 further includes sending the encoded first portion of the media stream to a computing device via a first network interface, at 506. For example, the mobile device 110 may send the encoded first portion of the media stream to the media server 150 via a 3G, 4G, or IEEE 802.11 interface.

The method 500 includes, while sending the encoded first portion, detecting a change in available network bandwidth based on a connection loss at the first network interface, at 508. For example, a 3G, 4G, or IEEE 802.11 interface of the mobile device 110 may lose network connectivity.

The method 500 also includes automatically adjusting the one or more encoding parameters in response to the change in the available network bandwidth, at 510. For example, the mobile device 110 may adjust an encoding bitrate, a frame rate, a frame resolution, a key frame interval, an audio CODEC, a video CODEC, etc. In a particular embodiment, the mobile device 110 may adjust the encoding parameters in a hierarchical order based on user-defined thresholds or threshold ranges, as described with reference to FIGS. 1-3.

The method 500 further includes encoding a second portion of the media stream based on the one or more adjusted encoding parameters, at 512, and sending the encoded second portion of the media stream from the mobile device to the computing device via a second network interface, at 514. For example, the encoder(s) 240 of the mobile device 110 may encode a second portion of the media stream based on the one or more adjusted encoding parameters, and the mobile device 110 may send the encoded second portion to the media server 150 via a different 3G, 4G, or IEEE 802.11 interface.

The method 500 of FIG. 5 may enable a mobile device (e.g., the mobile device 110) to dynamically adjust encoding parameter(s) in response to loss of a first network connection and continue providing a media stream to a computing device (e.g., the media server 150) via a second network connection. Examples of such scenarios include, but are not limited to, when a user of the mobile device transitions between 3G and 4G connections (e.g., when traveling in a vehicle) and between a 3G/4G connection and an IEEE 802.11 connection (e.g., when entering or exiting a building).

It should be noted that although various embodiments are described herein with reference to a "first portion" and a "second portion" of a media stream, this is for example only and not to be considered limiting. The disclosed systems and methods may be used to dynamically adjust encoding parameter(s) for multiple portions of a media stream (e.g., one or more of the methods FIGS. 4-5, or at least a portion thereof, may be repeated as each change in network bandwidth is detected).

Figure 6:
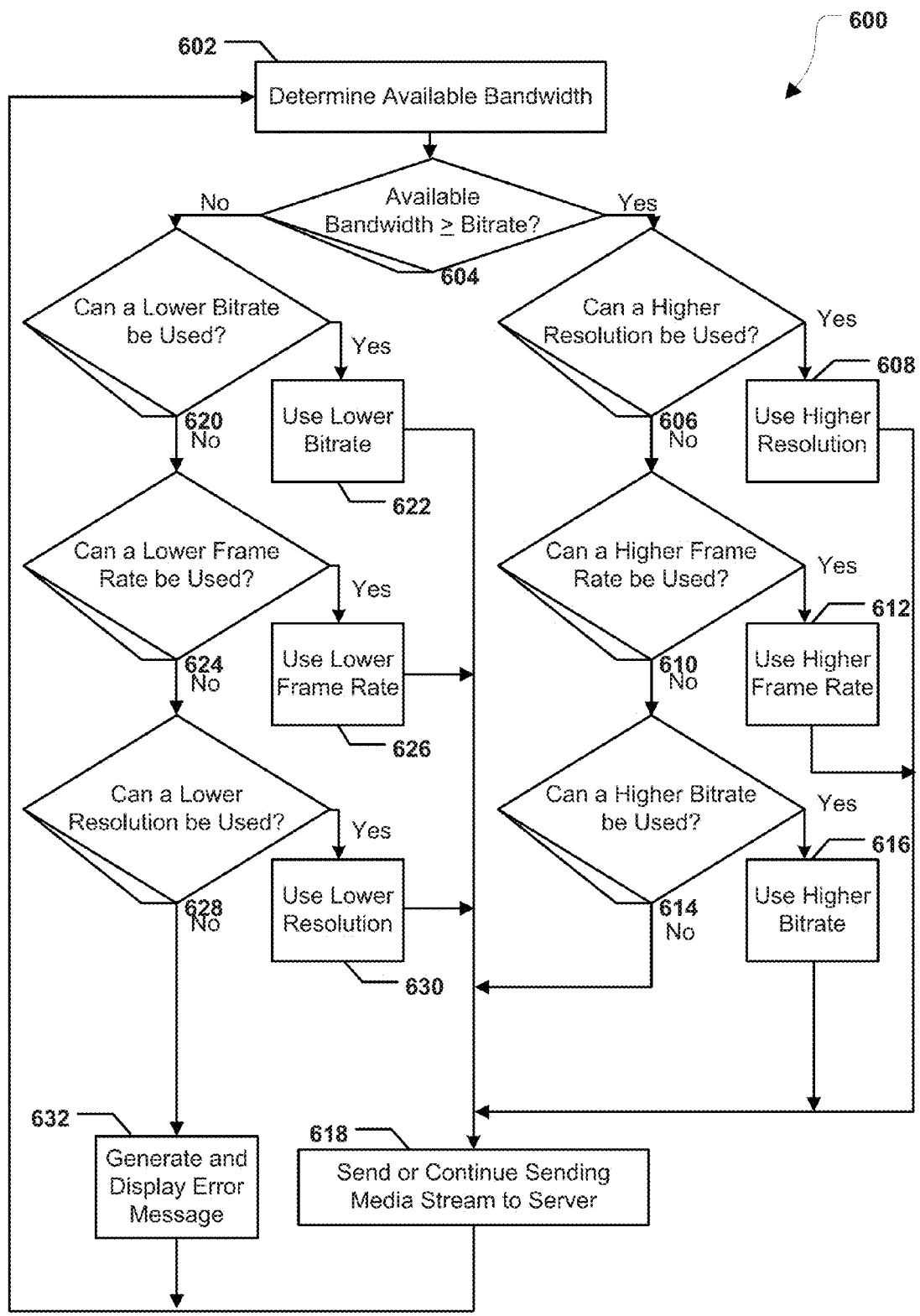
FIG. 6 is a flowchart that illustrates another embodiment of a method of adjusting encoding parameters at a mobile device based on a change in available network bandwidth.

FIG. 6 illustrates another particular embodiment of a method 600 of adjusting encoding parameters at a mobile device based on a change in available network bandwidth. In an illustrative embodiment, the method 600 may be performed by the mobile device 110 of FIGS. 1-2.

The method 600 includes determining an available network bandwidth, at 602, and comparing the available network bandwidth to a bitrate (e.g., an encoding bitrate) associated with a media stream, at 604. For example, if the available network bandwidth is higher than the encoding bitrate, then there may be a list of buffer overflow and the available network bandwidth may be insufficient to transport the media stream without excessive errors, interruptions, or packet loss. Conversely, if the available network bandwidth is lower than the encoding bitrate, the available network bandwidth is sufficient to accommodate a higher quality version of the media stream (and there may, in some cases, be a risk of buffer underflow). If the available network bandwidth is greater than or equal to the bitrate, the method 600 includes determining whether a higher frame resolution can be used, at 606. If a higher frame resolution can be used, then the higher frame resolution is used to encode a media stream, at 608.

If a higher frame resolution cannot be used (e.g., a threshold frame resolution has been reached or a user has disabled dynamic adjustment of frame resolution), the method 600 includes determining whether a higher frame rate can be used, at 610. If a higher frame rate can be used, then the higher frame rate is used to encode the media stream, at 612. If a higher frame rate cannot be used (e.g., a threshold frame rate has been reached or a user has disabled dynamic adjustment of frame rate), the method 600 includes determining whether a higher encoding bitrate can be used, at 614. If a higher encoding bitrate can be used, then the higher encoding bitrate is used to encode the media stream, at 616. Advancing to 618, the media stream is sent to the media server 150.

Returning to 604, when the available network bandwidth is less than the bitrate, the method 600 includes determining whether a lower encoding bitrate can be used, at 620. If a lower encoding bitrate can be used, then the lower encoding bitrate is used to encode the media stream, at 622. If a lower encoding bitrate cannot be used (e.g., a threshold encoding bitrate has been reached) then the method 600 includes determining whether a lower frame rate can be used, at 624.

If a lower frame rate can be used, then the slower frame rate is used to encode the media stream, at 626. If a lower frame rate cannot be used (e.g., a threshold frame rate has been reached or the user has disabled dynamic adjustment of frame rate), the method 600 includes determining whether a lower resolution can be used, at 628. If a lower resolution can be used, then the lower resolution is used to encode the media stream, at 630. Advancing to 618, the media stream is sent to the media server 150.

When a lower resolution cannot be used (e.g., a threshold resolution has been reached or the user has disabled dynamic adjustment of resolution), an error message may be generated and displayed, at 632. The method 600 may continue while the media stream is captured and transmitted by the mobile device 110.

It should be noted that the order of steps illustrated in the flowcharts of FIGS. 4-6 and described elsewhere herein are to be considered illustrative, and not limiting. In alternate embodiments, the order of steps may be different. Further, one or more steps may be optional and/or replaced by other steps. In addition, one or more steps may be consolidated.

Further, although one or more of the foregoing embodiments are described with reference to a mobile device sending a portion of a stream, detecting a change in available bandwidth, and then adjusting encoding of the stream, this order of steps is for illustration, and is not to be considered limiting. In particular embodiments, the mobile device may transmit non-stream data (e.g., via TCP) to detect available bandwidth prior to encoding and transmitting a stream (or a portion thereof). Thus, in particular embodiments, a mobile device may perform "pre-detection" prior to starting encoding and/or transmission of an initial portion (e.g., chunk) of a stream.

It should be noted that although the foregoing embodiments are described with reference to a live media stream being captured by a mobile device, in alternate embodiments, the described techniques may also be used in conjunction with media data stored at the mobile device (e.g., a video on demand (VOD) stream). When the media data is stored at the mobile device the mobile device may decode the media data via the decoder(s) 245 prior to re-encoding the data via the encoder(s) 240.

In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the mobile device 110 of FIGS. 1-2, the media server 150 of FIG. 1, one or more of the computing devices 180 of FIG. 1, or any combination thereof.

In a networked deployment, the computer system may operate in the capacity of a server or as a client user computer in a server-client user network environment, or as a peer computer system in a peer-to-peer (or distributed)

network environment. The term "system" can include any collection of systems or sub-systems that individually or jointly execute a set, or multiple sets, of instructions to perform one or more computer functions.

In a particular embodiment, the instructions can be embodied in a computer-readable or a processor-readable device. The terms "computer-readable device" and "processor-readable device" include a single storage device or multiple storage devices, such as a centralized or distributed database, and/or associated caches and servers that store one or more sets of instructions. The terms "computer-readable device" and "processor-readable device" also include any device that is capable of storing a set of instructions for execution by a processor or that cause a computer system to perform any one or more of the methods or operations disclosed herein. For example, a computer-readable or processor-readable device or storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid state memory, or any other form of storage device. A computer-readable or processor-readable device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real time). Examples of such events may include, but are not limited to, in-progress sporting events, musical performances, video-conferences, webcam feeds, birthday parties, school plays, and other streams captured by fixed or mobile devices. It should be noted that a live stream may be delayed with respect to the event being captured (e.g., in accordance with government or industry regulations, such as delay regulations enforced by the Federal Communications Commission (FCC)).

In a particular embodiment, a method includes encoding, at a mobile device having a camera, a first portion of a media stream captured by the camera based on an encoding parameter. The method also includes sending the encoded first portion of the media stream from the mobile device to a computing device via a network connection. The method further includes detecting a change in available network bandwidth of the network connection. The method includes automatically adjusting the encoding parameter in response to the change in the available network bandwidth. The method also includes encoding a second portion of the media stream based on the adjusted encoding parameter and sending the encoded second portion of the media stream from the mobile device to the computing device.

In another particular embodiment, a mobile device includes at least one processor and a camera configured to capture a media stream. The mobile device also includes a memory storing instructions executable by the at least one processor to perform operations including encoding a first portion of the media stream captured by the camera based on an encoding parameter. The operations also include sending the encoded first portion of the media stream from the mobile device to a computing device via the first network interface. The operations further include detecting a change in available network bandwidth based on a network connection loss at the first network interface. The operations include automatically adjusting the encoding parameter in response to the change in the available network bandwidth. The operations also include encoding a second portion of the media stream based on the adjusted encoding parameter and sending the encoded second portion of the media stream from the mobile device to the computing device via the second network interface.

In another particular embodiment, a computer-readable storage device stores instructions that, when executed by a processor, cause the processor to perform operations including encoding, at a mobile device having a camera, a first portion of a media stream captured by the camera based on an encoding parameter. The operations also include sending the encoded first portion of the media stream from the mobile device to a computing device via a network connection. The operations further include detecting a change in available network bandwidth of the network connection. The operations include automatically adjusting the encoding parameter in response to the change in the available network bandwidth. The operations include encoding a second portion of the media stream based on the adjusted encoding parameter and sending the encoded second portion of the media stream from the mobile device to the computing device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
encoding, at a mobile device, a first portion of a media stream based on a plurality of encoding parameters, the first portion of the media stream captured by the mobile device;
detecting, at the mobile device during capture of the media stream, a change in available network bandwidth of a network connection of the mobile device;
selecting, at the mobile device, a first encoding parameter of the plurality of encoding parameters, instead of a second encoding parameter of the plurality of encoding parameters, for adjustment, the first encoding parameter selected in response to determining that a value of the second encoding parameter is outside a threshold range;
adjusting, at the mobile device, the value of the first encoding parameter from a first value to a second value based on the change in the available network bandwidth and refraining from adjusting the second encoding parameter while the value of the second encoding parameter is outside the threshold range; and
encoding, at the mobile device, a second portion of the media stream based on the second value of the first encoding parameter.

2. The method of claim 1, further comprising sending the encoded second portion of the media stream from the mobile device via the network connection to a server, wherein the server is distinct from the mobile device.

3. The method of claim 1, wherein the plurality of encoding parameters include an encoding bitrate, a frame resolution, a frame rate, a key frame interval, an audio coder/decoder (CODEC), or a video CODEC.

4. The method of claim 1, further comprising detecting the change in the available network bandwidth based on a signal strength associated with the network connection.

5. The method of claim 1, further comprising detecting the change in the available network bandwidth based on quality of service (QoS) information associated with the network connection.

6. The method of claim 1, further comprising detecting the change in the available network bandwidth based on packet loss associated with the network connection.

7. The method of claim 1, further comprising detecting the change in the available network bandwidth based on a real-time transport protocol (RTP) control protocol (RTCP) receiver report.

8. The method of claim 1, further comprising detecting the change in the available network bandwidth based on detecting:
a transition in the network connection from a first wireless network to a second wireless network, or
a transition in the network connection from a first available bandwidth of a wireless network to a second available bandwidth of the wireless network.

9. The method of claim 8, wherein the first wireless network comprises an Institute of Electrical and Electronics Engineers (IEEE) 802.11 wireless network, a Fourth Generation (4G) wireless network, a Third Generation (3G) wireless network, a Long Term Evolution (LTE) wireless network, or an LTE Advanced wireless network.

10. The method of claim 8, wherein the second wireless network comprises an Institute of Electrical and Electronics Engineers (IEEE) 802.11 wireless network, a Fourth Generation (4G) wireless network, a Third Generation (3G) wireless network, a Long Term Evolution (LTE) wireless network, or an LTE Advanced wireless network.

11. The method of claim 1, further comprising receiving an input at the mobile device identifying a threshold frame resolution, a threshold frame rate, or a combination thereof.

12. The method of claim 1, wherein the change in the available network bandwidth is detected based on detecting a transition of the mobile device from a first type of network connection to a second type of network connection.

13. The method of claim 1, wherein the first encoding parameter and the second encoding parameter are different encoding parameters selected from a group consisting of encoding bitrate, encoding frame rate, and encoding frame resolution.

14. The method of claim 13, wherein, in response to the change in network bandwidth, the mobile device is configured to:
decrease the encoding bitrate instead of decreasing the encoding frame rate or an encoding frame resolution;
decrease the encoding frame rate instead of decreasing the encoding frame resolution;
increase the encoding frame resolution instead of increasing the encoding frame rate or the encoding bitrate; and
increase the encoding frame rate instead of increasing the encoding bitrate.

15. The method of claim 1, further comprising receiving an input at the mobile device indicating whether adjustment of encoding frame resolution is permitted, whether adjustment of encoding frame rate is permitted, or a combination thereof.

16. The method of claim 1, wherein the mobile device comprises a software encoder, a hardware encoder, or a combination thereof, and wherein the media stream is a live video stream or a live audio stream.

17. A mobile device comprising:
a camera configured to capture a media stream;
at least one processor;
a network interface; and
a memory storing instructions executable by the at least one processor to perform operations comprising:
encoding a first portion of the media stream captured by the camera based on a plurality of encoding parameters;
detecting, during capture of the media stream, a change in available network bandwidth of a network connection associated with the network interface;
selecting a first encoding parameter of the plurality of encoding parameters, instead of a second encoding parameter of the plurality of encoding parameters, for adjustment, the first encoding parameter selected in response to determining that a value of a first value of the first encoding parameter to a second value based on the change in the available network bandwidth and refraining from adjusting the second encoding parameter while the value of the second encoding parameter is outside of a threshold range; and
encoding, at the mobile device, a second portion of the media stream based on the second value of the first encoding parameter.

18. The mobile device of claim 17, wherein the operations further comprise sending the encoded second portion of the media stream to a media server that is configured to generate a plurality of renditions of the media stream for adaptive bitrate (ABR) streaming to one or more destination devices.

19. A computer-readable storage device storing instructions that, when executed by a processor, cause the processor to perform operations comprising:
   encoding, at a mobile device, a first portion of a media stream based on a plurality of encoding parameters;
   detecting, at the mobile device during capture of the media stream, a change in available network bandwidth of a network connection of the mobile device;
   selecting a first encoding parameter of the plurality of encoding parameters, instead of a second encoding parameter of the plurality of encoding parameters, for adjustment, the first encoding parameter selected in response to determining that a value of the second encoding parameter is outside a threshold range;
   adjusting, at the mobile device, a first value of the first encoding parameter to a second value based on the change in the available network bandwidth and refraining from adjusting the second encoding parameter while the value of the second encoding parameter is outside of the threshold range; and
   encoding, at the mobile device, a second portion of the media stream based on the second value of the first encoding parameter.

20. The computer-readable storage device of claim 19, wherein the instructions further cause the processor to perform the operations comprising:
   detecting a second change in the available network bandwidth of the network connection;
   determining if a charge level of a battery of the mobile device is less than or equal to a threshold;
   in response to determining that the charge level of the battery is less than or equal to the threshold, preventing a change from the second value of the first encoding parameter to a third value, the third value associated with an increase in the available network bandwidth of the network connection; and
   encoding a third portion of the media stream based on the second value of the first encoding parameter.

* * * * *